US012628809B2

(12) United States Patent
Centola et al.

(10) Patent No.: US 12,628,809 B2
(45) Date of Patent: May 19, 2026

(54) METHODS AND ALGORITHMS FOR OPTIMIZING APPLICATION OF RESIDUE LIMITED CROP PROTECTION PRODUCTS USING VARIABLE-RATE APPLICATION

(71) Applicant: SYNGENTA CROP PROTECTION AG, Basel (CH)

(72) Inventors: Flavio Centola, Schaffhausen (CH); Doron Gal, Caesarea (IL)

(73) Assignee: SYNGENTA CROP PROTECTION AG, Basel (CH)

( * ) Notice: Subject to any disclaimer, the term of this patent is extended or adjusted under 35 U.S.C. 154(b) by 202 days.

(21) Appl. No.: 17/996,297

(22) PCT Filed: Apr. 14, 2021

(86) PCT No.: PCT/IL2021/050427
§ 371 (c)(1),
(2) Date: Oct. 14, 2022

(87) PCT Pub. No.: WO2021/209997
PCT Pub. Date: Oct. 21, 2021

(65) Prior Publication Data
US 2023/0217914 A1 Jul. 13, 2023

Related U.S. Application Data

(60) Provisional application No. 63/010,783, filed on Apr. 16, 2020.

(51) Int. Cl.
*A01M 7/00* (2006.01)
*G06Q 10/0631* (2023.01)
*G06Q 50/02* (2024.01)

(52) U.S. Cl.
CPC ..... *A01M 7/0089* (2013.01); *G06Q 10/06316* (2013.01); *G06Q 50/02* (2013.01)

(58) Field of Classification Search
CPC .......... A01M 7/0089; G06Q 10/06316; G06Q 50/02; G06Q 50/00; G06N 20/00; A01B 79/005
See application file for complete search history.

(56) References Cited

U.S. PATENT DOCUMENTS 4,992,942 A * 2/1991 Bauerle .................. A01G 31/00
706/930
5,884,224 A * 3/1999 McNabb .................. A01G 7/00
700/284
(Continued)

FOREIGN PATENT DOCUMENTS

CA 3029322 A1 * 1/2018 ........... A01B 79/005
CN 107315381 A * 11/2017 ........... G05B 19/048
(Continued)

OTHER PUBLICATIONS

VanWoerkom, Anthony Hale. Managing Pesticide Residue Levels of Michigan Apples and Cherries to Meet Global MRLs. Michigan State University, 2017. (Year: 2017).*
(Continued)

*Primary Examiner* — Thomas Yih Ho
(74) *Attorney, Agent, or Firm* — BakerHostetler; Toni-Junell Herbert

(57) ABSTRACT

Described herein are methods and systems for generating instructions for variable rate application of crop protection materials, comprising computing a total dosage of crop protection material(s) allowed for application in a crop field such that crop protection material(s) residue in products of crop planted in the crop field does not exceed a predefined MRL, adjusting the total dosage according to residue affecting parameters, mapping the crop field to segments according to pest distribution of one or more pests in each segment, computing a dosage of the crop protection material(s) estimated to effectively control the pest(s) in each segment
(Continued)

based on the pest distribution in the respective segment, computing a variable rate application of the crop protection material total dosage in the crop field based on the dosage estimated for each segment, and outputting instructions to apply the crop protection material(s) in the crop field according to the variable rate application.

17 Claims, 4 Drawing Sheets

(56) References Cited

U.S. PATENT DOCUMENTS

| | | | | |
|---|---|---|---|---|
| 6,230,091 | B1 * | 5/2001 | McQuinn | A01B 79/005 |
| | | | | 700/282 |
| 8,924,030 | B2 * | 12/2014 | Wendte | A01B 79/005 |
| | | | | 700/283 |
| 9,563,852 | B1 * | 2/2017 | Wiles | A01B 79/005 |
| 9,756,844 | B2 * | 9/2017 | Groeneveld | G01C 21/3826 |
| 10,957,036 | B2 * | 3/2021 | Stueve | G06T 7/001 |
| 11,477,935 | B1 * | 10/2022 | Muehlfeld | A01M 7/0089 |
| 11,968,973 | B2 * | 4/2024 | Seitz | A01M 7/0089 |
| 2002/0040300 | A1 * | 4/2002 | Ell | G06Q 10/0631 |
| | | | | 705/26.1 |
| 2015/0100358 | A1 * | 4/2015 | Klavins | A01M 17/00 |
| | | | | 705/7.12 |
| 2015/0370935 | A1 * | 12/2015 | Starr | G06Q 10/06 |
| | | | | 703/11 |
| 2019/0050948 | A1 * | 2/2019 | Perry | G06F 30/27 |
| 2019/0174739 | A1 | 6/2019 | Peters et al. | |
| 2019/0246549 | A1 * | 8/2019 | Peters | G05D 1/0274 |
| 2020/0281110 | A1 * | 9/2020 | McNichols | A01M 7/0089 |
| 2021/0078706 | A1 * | 3/2021 | Lin | A01C 23/047 |

FOREIGN PATENT DOCUMENTS

| | | | | |
|---|---|---|---|---|
| CN | 107391952 A | | 11/2017 | |
| CN | 109845715 A | * | 6/2019 | A01B 79/005 |
| CN | 110415133 A | * | 11/2019 | |
| CN | 110461148 A | | 11/2019 | |
| EP | 3378306 A1 | * | 9/2018 | A01M 11/00 |
| WO | WO-0195217 A1 | * | 12/2001 | A01B 79/005 |
| WO | WO-0232222 A1 | * | 4/2002 | A01M 7/0089 |
| WO | WO-2012047834 A1 | * | 4/2012 | A01M 17/00 |
| WO | WO-2018216214 A1 | * | 11/2018 | A01M 7/00 |
| WO | WO-2019148138 A1 | * | 8/2019 | A01B 69/00 |

OTHER PUBLICATIONS

MacLachlan, Dugald J., and Denis Hamilton. "A review of the effect of different application rates on pesticide residue levels in supervised residue trials." Pest management science 67.6 (2011): 609-615. (Year: 2011).*

McKenzie, Ross H. "Variable rate fertilizer application—a common sense approach." Top Crop Manager (2014) (accessed on Aug. 6, 2024 at https://www.topcropmanager.com/variable-rate-fertilizer-application-a-common-sense-approach-14852/). (Year: 2014).*

Campos, Javier, et al. "On-farm evaluation of prescription map-based variable rate application of pesticides in vineyards." Agronomy 10.1 (2020): 102. (Year: 2020).*

Talaviya, Tanha, et al. "Implementation of artificial intelligence in agriculture for optimisation of irrigation and application of pesticides and herbicides." Artificial Intelligence in Agriculture 4 (2020): 58-73. (Year: 2020).*

Yang, Chenghai. "Remote sensing and precision agriculture technologies for crop disease detection and management with a practical application example." Engineering 6.5 (2020): 528-532. (Year: 2020).*

European Food Safety Authority. Recommendations on the use of the proportionality approach in the framework of risk assessment for pesticide residues. vol. 15. No. 11. 2018. (Year: 2018).*

Smith, Graeme, and Peter Dal Santo. Neutralising pesticides in recirculating water systems within a protected cropping system. Horticulture Australia, 2011. (Year: 2011).*

WIPO; App. No. PCT/IL2021/050427; International Search Report and Written Opinion mailed Jul. 27, 2021.

English Translation of the Chinese Office Action issued in Chinese Patent Application No. 202180029034.1 dated Apr. 8, 2025; 8 pages.

\* cited by examiner

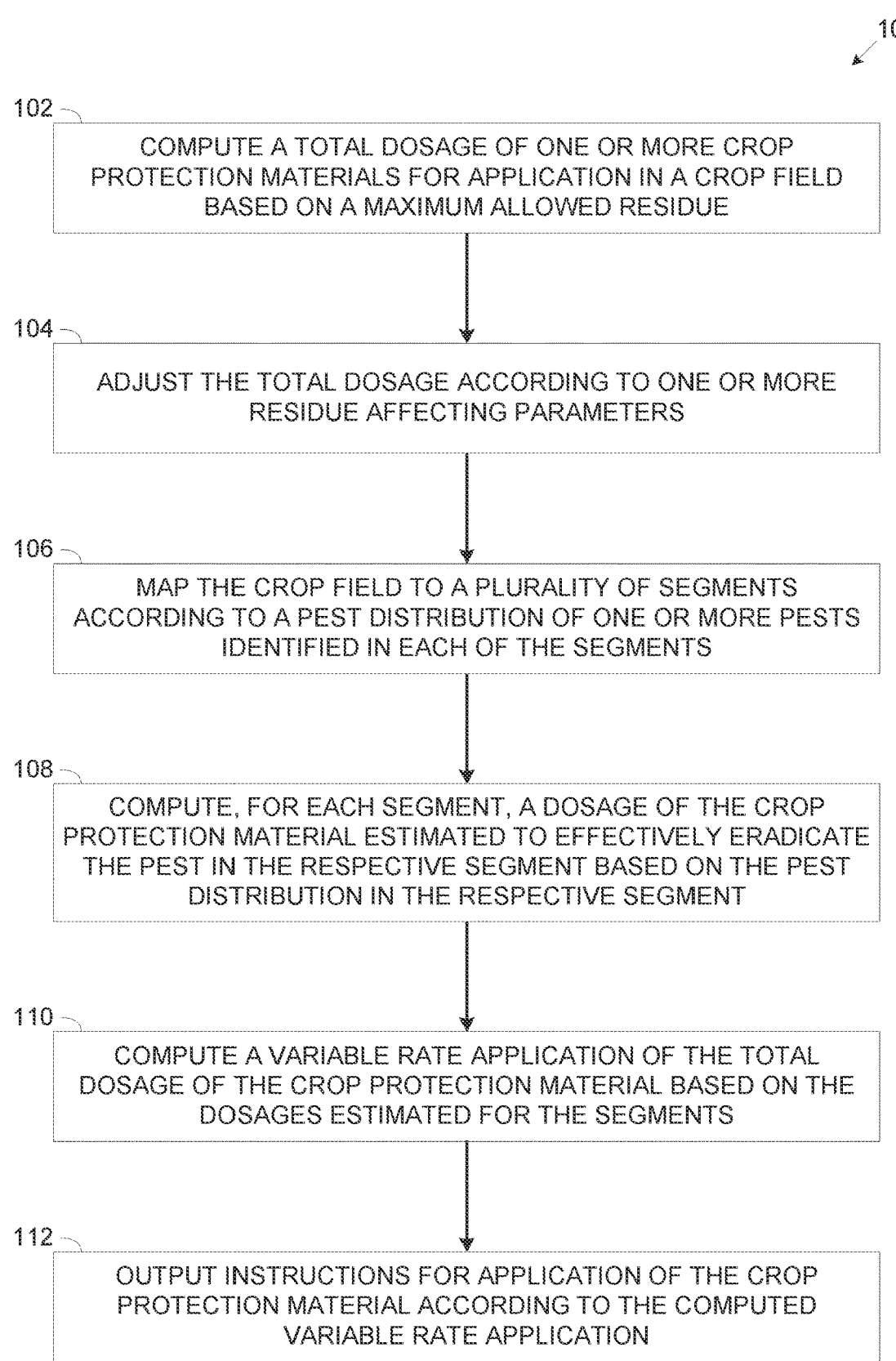

100

102 — COMPUTE A TOTAL DOSAGE OF ONE OR MORE CROP PROTECTION MATERIALS FOR APPLICATION IN A CROP FIELD BASED ON A MAXIMUM ALLOWED RESIDUE

104 — ADJUST THE TOTAL DOSAGE ACCORDING TO ONE OR MORE RESIDUE AFFECTING PARAMETERS

106 — MAP THE CROP FIELD TO A PLURALITY OF SEGMENTS ACCORDING TO A PEST DISTRIBUTION OF ONE OR MORE PESTS IDENTIFIED IN EACH OF THE SEGMENTS

108 — COMPUTE, FOR EACH SEGMENT, A DOSAGE OF THE CROP PROTECTION MATERIAL ESTIMATED TO EFFECTIVELY ERADICATE THE PEST IN THE RESPECTIVE SEGMENT BASED ON THE PEST DISTRIBUTION IN THE RESPECTIVE SEGMENT

110 — COMPUTE A VARIABLE RATE APPLICATION OF THE TOTAL DOSAGE OF THE CROP PROTECTION MATERIAL BASED ON THE DOSAGES ESTIMATED FOR THE SEGMENTS

112 — OUTPUT INSTRUCTIONS FOR APPLICATION OF THE CROP PROTECTION MATERIAL ACCORDING TO THE COMPUTED VARIABLE RATE APPLICATION

METHODS AND ALGORITHMS FOR OPTIMIZING APPLICATION OF RESIDUE LIMITED CROP PROTECTION PRODUCTS USING VARIABLE-RATE APPLICATION

CROSS-REFERENCE TO RELATED APPLICATIONS

This application is a 371 National Stage Application of International Application No. PCT/IL2021/050427, filed Apr. 14, 2021, which claims priority to U.S. Provisional Application No. 63/010,783, filed Apr. 16, 2020, the entire contents of which are each incorporated by reference herein.

FIELD AND BACKGROUND OF THE INVENTION

The present invention, in some embodiments thereof, relates to applying crop protection materials in crop fields planted, and, more specifically, but not exclusively, to applying crop protection materials in crop fields according to a variable rate application plan.

Pests, for example, weeds, nematodes, mites, fungus, insects, disease pathogens and/or the like have presented a constant challenge for agriculture since the days of the agricultural revolution.

Various means, methods and systems were therefore developed to control (e.g. eradicate, kill, incapacitate, repel, deter, contain, limit, discourage, etc.) the pests in order to prevent the pests from infecting farmed fields and crops planted in those fields and/or competing with the crops for resources (e.g. water, soil, fertilizers, etc.) thus inflicting injury or damage to the crops or degrading the crops yield and/or quality.

One of the most effective means used in modern agriculture for controlling pests involves use of various chemical and/or biological materials and substances applied in crop fields, for example, herbicide, fungicide, pesticide, nematicide, insecticide, miticide, surfactant and/or the like. However, such chemical materials may have undesired side effects since residues of these chemicals which could be potentially hazardous may remain in the crops, specifically in the crop products extracted from the crop fields and may result in health risks when such products are consumed.

SUMMARY OF THE INVENTION

According to a first aspect of the present invention there is provided a computer implemented method of generating instructions for variable rate application of crop protection materials, comprising:

Computing a total dosage of one or more crop protection materials allowed for application in a crop field such that residue of the crop protection material(s) in a product of a crop planted in the crop field does not exceed a predefined a Maximum Residue Limit (MRL).

Adjusting the total dosage according to at least some of a plurality of residue affecting parameters of the crop field.

Mapping the crop field to a plurality of segments according to a pest distribution of one or more pests in each of the plurality of segments.

Computing a dosage of the crop protection material(s) estimated to effectively control the pest(s) in each of the plurality of segments based on the pest distribution in the respective segment.

Computing a variable rate application of the crop protection material total dosage in the crop field based on the dosage estimated for each of the plurality of segments.

Outputting instructions to apply the crop protection material(s) in the crop field according to the variable rate application.

According to a second aspect of the present invention there is provided a system for generating instructions for variable rate application of crop protection materials, comprising one or more processors executing a code, the code comprising:

Code instructions to compute a total dosage of one or more crop protection materials allowed for application in a crop field such that residue of the crop protection material(s) in a product of a crop planted in the crop field does not exceed a predefined MRL.

Code instructions to adjust the total dosage according to at least some of a plurality of residue affecting parameters of the crop field.

Code instructions to map the crop field to a plurality of segments according to a pest distribution of one or more pests in each of the plurality of segments.

Code instructions to compute a dosage of the crop protection material(s) estimated to effectively control the pest(s) in each of the plurality of segments based on the pest distribution in the respective segment.

Code instructions to compute a variable rate application of the crop protection material total dosage in the crop field based on the dosage estimated for each of the plurality of segments.

Code instructions to output instructions to apply the crop protection material(s) in the crop field according to the variable rate application.

According to a third aspect of the present invention there is provided a computer program product comprising computer readable program code to be executed by one or more processor when retrieved from a non-transitory computer readable medium, the program code comprising code instructions to generate instructions for variable rate application of crop protection materials by:

Computing a total dosage of one or more crop protection materials allowed for application in a crop field such that residue of the crop protection material(s) in a product of a crop planted in the crop field does not exceed a predefined a Maximum Residue Limit (MRL).

Adjusting the total dosage according to at least some of a plurality of residue affecting parameters of the crop field.

Mapping the crop field to a plurality of segments according to a pest distribution of one or more pests in each of the plurality of segments.

Computing a dosage of the crop protection material(s) estimated to effectively control the pest(s) in each of the plurality of segments based on the pest distribution in the respective segment.

Computing a variable rate application of the crop protection material total dosage in the crop field based on the dosage estimated for each of the plurality of segments.

Outputting instructions to apply the crop protection material(s) in the crop field according to the variable rate application.

In a further implementation form of the first, second and/or third aspects, the instructions further define applying the one or more crop protection material to at least a subset of the plurality of segments according to the variable rate application, the subset comprises segments selected from the plurality of segments such that a cumulative dosage which does not exceed the total dosage.

In a further implementation form of the first, second and/or third aspects, the subset comprises segments selected from the plurality of segments based on a ranking score computed for each of the plurality of segments based on a respective pest distribution in the respective segment such that the subset includes a plurality of highest ranking segments of the plurality of segments having a cumulative dosage which does not exceed the total dosage.

In a further implementation form of the first, second and/or third aspects, the instructions further define applying a plurality of crop protection materials each according to a respective variable rate application in case multiple crop protection materials are selected for application in one or more of the segments.

In an optional implementation form of the first, second and/or third aspects, one or more crop protection material(s) are selected according to one or more of the pest(s) identified based on the pest distribution.

In a further implementation form of the first, second and/or third aspects, each of the one or more pests is a member of a group consisting of: weed, nematode, mite, fungi, insect and disease pathogen.

In a further implementation form of the first, second and/or third aspects, each of the one or more crop protection material is a member of a group consisting of: herbicide, fungicide, pesticide, nematicide, insecticide, miticide, surfactant and adjuvant.

In a further implementation form of the first, second and/or third aspects, the plurality of residue affecting parameters comprise: a type of one or more of the crop protection material(s), a growth stage of the crop, an estimated biomass of the crop, an estimated residue from one or more previous crop protection material applications in the crop field, an estimated residual crop protection material estimated for one or more future crop protection material applications planned for the crop field, an Organic Matter (OM) content in the crop field, a type of one or more of the pest(s), a type of one or more crop protection materials previously applied in the crop field, and an environmental condition in a geographical region of the crop field.

In a further implementation form of the first, second and/or third aspects, the pest distribution is identified based on analysis of one or more images of the crop field.

In a further implementation form of the first, second and/or third aspects, the pest distribution is identified based on analysis of one or more past images of the crop field captured in one or more previous growth cycle.

In a further implementation form of the first, second and/or third aspects, the pest distribution is identified based on analysis of one or more crop growth reports generated for the crop field.

In a further implementation form of the first, second and/or third aspects, the pest distribution is identified based on analysis of sensory data captured in the crop field by one or more sensors.

In an optional implementation form of the first, second and/or third aspects, the mapping the plurality of segments is further based on a zone map of the crop field mapping the crop field to a plurality of zones based on one or more of a plurality of soil attribute of each of the zones, the plurality of zone attributes comprising soil attributes, water attributes and topographic attributes.

In a further implementation form of the first, second and/or third aspects, the effective control reflects eradicating and/or repelling at least a predefined minimal percentage of one or more of the pest(s) in the respective segment.

In a further implementation form of the first, second and/or third aspects, the effective control reflects limiting an impact of one or more of the pest(s) to less than a predefined maximal percentage of a yield of the crop in the respective segment.

In an optional implementation form of the first, second and/or third aspects, one or more machine learning models are applied to compute the respective dosage for one or more of the plurality of segments. The one or more machine learning models are trained to correlate between a plurality of dosages of one or more of the crop protection material(s) and effective control of a plurality of pest distributions of one or more of the pest(s).

In an optional implementation form of the first, second and/or third aspects, the variable rate application is first computed followed by computing the total dosage by:

Mapping the crop field to the plurality of segments based on the pest distribution.

Computing a respective dosage of the crop protection material(s) for each of the plurality of segments based on the pest distribution in the respective segment.

Computing the variable rate application based on the dosage estimated for each of the plurality of segments.

Computing the total dosage such that residue of the at least one crop protection material in a product of a crop planted in the crop field does not exceed the predefined MRL.

In an optional implementation form of the first, second and/or third aspects, the variable rate application and/or part thereof are rejected in case a cumulative dosage of the respective dosages of the plurality of segments exceeds the total dosage.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a flowchart of an exemplary process of generating instructions for variable rate application of crop protection materials in a crop field mapped to a plurality of segments based on pest distribution, according to some embodiments of the present invention;

DESCRIPTION OF SPECIFIC EMBODIMENTS OF THE INVENTION

Figure 2:
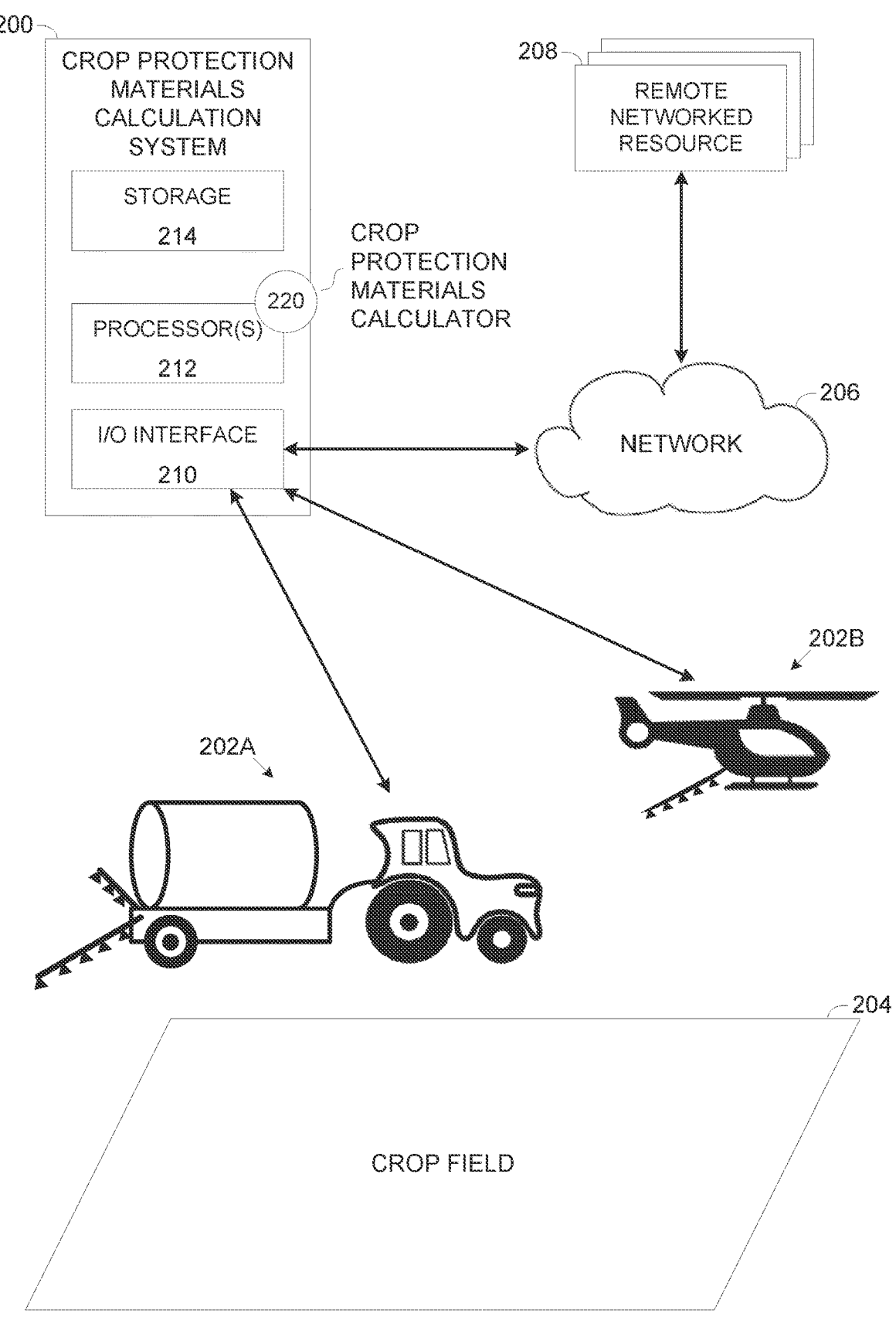
FIG. 2 is a schematic illustration of an exemplary system for generating instructions for variable rate application of crop protection materials in a crop field mapped to a plurality of segments based on pest distribution, according to some embodiments of the present invention.

The present invention, in some embodiments thereof, relates to applying crop protection materials in crop fields, and, more specifically, but not exclusively, to applying crop protection materials in crop fields according to a variable rate application plan.

Modern agriculture uses a wide range of chemical materials and substances designed and configured to control pests, for example, eradicate, kill, incapacitate, repel, deter, contain, limit, and/or otherwise discourage the pests from infecting the field, its soil, and/or one or more crops planted in a crop field, for example, a farmland, an orchard, a garden, a plantation, a vineyard and/or the like.

Pests may include, for example, weed, nematode, mite, fungi, insect, disease pathogen and/or the like and the chemicals may therefore include a wide variety of crop protection materials, for example, herbicide, fungicide, pesticide, nematicide, insecticide, miticide, surfactant and/or the like which may be selected to effectively eradicate the specific pests identified in the crop field. The crop protection materials may include one or more substances or mixture of substances intended for controlling, preventing, destroying, repelling, or mitigating one or more pests and intended for use as a plant regulator, defoliant, and/or desiccant.

However, residues of the crop protection materials, their metabolites or other degradation products may remain and contaminate the crop, specifically the crop products extracted (harvested, picked, collected, etc.) from the crop field. Since these crop protection materials, and/or their metabolites or other degradation products, may be potentially hazardous, the remaining residue may present one or more health risks when consuming the crop product. In order to ensure that the level (amount, concentration, percentage, etc.) of the residue of the crop protection materials in the crop final (consumable) product is within a safe margin, a Maximum Residue Limit (MRL) may be predefined and enforced accordingly to set an acceptable non-hazardous residue level of each and/or combination of the crop protection materials in the crop products. The maximal residue level defined by the MRL may further include, in addition to direct residues of the crop protection materials, one or more metabolites and/or other degradation products of the crop protection material(s) which may arrive at the crop, specifically the crop product either directly, via the plant, via the soil in which the crop is planted and/or the like. The predefined MRL which defines the maximum amount of residue allowed on the crop product may be defined, set and/or enforced by one or more health and/or regulatory agencies. Crop products labels may often state their MRL to convey this information throughout the supply chain and/or part thereof down to the end customer.

The total dosage (amount) of one or more crop protection material and/or a combination of multiple such crop protection materials which is allowed for application in a certain crop field during a certain growth cycle may be therefore derived from the MRL predefined for the crop's end product extracted from the certain crop field. In other words, the total dosage allowed for application of crop protection material(s) in the certain crop field must be such that a cumulative residue of the crop protection material(s) in the crop's product must not exceed the predefined MRL.

Specifically, the total allowed dosage may be derived from an average residue of the crop protection material(s) in the crop's products such that the residue averaged across all products of the crop does not exceed the predefined MRL. This may apply in particular to crop products which are mixed together after extracted from the crop field. Such crops may include wide range of crop and plant families comprising field crops, vegetable crops, fruits, semi-perennial crops and perennial crops to name just a few. These crops may include, for example, cereals (e.g. wheat, barley, rye, oats, rice, sorghum and related crops), beet (e.g. sugar beet and fodder beet), pomes, stone fruit and soft fruit (e.g. apples, pears, plums, peaches, almonds, cherries, strawberries, raspberries and blackberries), leguminous plants (e.g. beans, lentils, peas, soybeans), oil plants (e.g. rape, mustard, poppy, olives, sunflowers, coconut, castor oil plants, cocoa beans and groundnuts), cucumber plants (e.g. marrows, cucumbers and melons), fiber plants (e.g. cotton, flax, hemp and jute), citrus fruit (e.g. oranges, lemons, grapefruit and mandarins), vegetables (e.g. spinach, lettuce, asparagus, cabbages, carrots, onions, tomatoes, potatoes and paprika), lauraceae (e.g. avocados, cinnamon and camphor), plants such as maize, tobacco, nuts, coffee, sugar cane, tea, vines, hops, bananas and natural rubber plants and/or the like. The crops may further include ornamentals such as, for example, flowers, shrubs, broad-leaved trees and/or evergreens, such as, for example, conifers and/or the like.

Moreover, the level of residue may be affected by one or more parameters of the crop field (e.g. soil, water, topography), the crop protection materials applied in the crop field during the entire growth cycle of the crop, environmental conditions (e.g. climate, weather) and/or the like, collectively designated residue affecting parameters herein after.

According to some embodiments of the present invention, there are provided systems, methods and computer program products for generating instructions for variable rate application of one or more crop protection materials in a crop field mapped to a plurality of segments based on pest distribution in order to apply effective dosages of the crop protection material in different sections or segments of the crop field while not exceeding a total (overall) dosage of the crop protection material(s) allowed for application in the entire crop which is derived from the MRL predefined for the products of the crops extracted from the crop field.

The total dosage of one or more of the crop protection materials selected for application in the crop field is first computed based on the MRL predefined for the crop product eventually extracted (at the end of the growth cycle) from the crop field. The total dosage is the maximal dosage of the crop protection material(s) that is allowed for application (spray, sprinkle, scatter, etc.) in the entire crop field such that the residue of the crop protection material(s) in the crop's products does not exceed the predefined MRL. In particular, the total dosage may be the maximal dosage of the crop protection material(s) allowed for application in the crop field such that the residue of the crop protection material(s) average across the products extracted from the entire crop field does not exceed the predefined MRL.

The residue level of the crop protection material(s) in the crop products may be primarily dependent on the amount of crop protection material(s) applied on the crops and the disintegration rate or decay time of the applied crop protection material(s). The anticipated residue level may be therefore estimated based on the amount of the crop protection material(s) sprayed (applied) in the crop field and a time to product extraction (harvest).

However, since the residue level may be affected by one or more of the residue affecting parameters, the total dosage may be adjusted according to the residue affecting parameters which are applicable for the crop field. For example, the total dosage may be affected by the type of the crop protection material(s) selected for application in the crop field since different crop protection material(s) may have different residue attributes (e.g. decay time, disintegration rate, etc.) and/or different residue impact. In another example, the total dosage may be affected by one or more other, past and/or future, applications of crop protection material(s) in the crop field, specifically in the current growth cycle since a cumulative residue level of the crop protection material(s) in the crop product must not exceed the MRL. In another example, the total dosage may be affected by one or more environmental and/or climate conditions, for example, rainy weather may contribute to increased wash away of the residues from the crop and/or the crop product which may reduce the reside level.

The crop field may be then segmented to a plurality of segments based on a pest distribution obtained for the crop field such that the pest distribution in each of the segments is substantially uniform. Optionally, the plurality of segments may be mapped according to one or more pest distribution scales, for example, a percentage of infected crop plants and/or the like such that the pest distribution in each of the segments is within a predefined range of pest distribution, for example, 0%-10%, 11%-20%, 21%-30%, 31%-40% and so on.

The pest distribution (e.g. amount, density, concentration, etc.) may be mapped in the crop field based on analysis of sensory data captured by one or more sensors to depict the crop field. For example, the sensory data may include one or more images of the crop field which may be analyzed to identify visual evidence and/or signs of the pests, for example, presence of weeds, visual alterations and/or symptoms in the crop plants indicative of potential infection and/or injury by one or more of the pests and/or the like. In another example, the sensory data may include spectral mapping of the crop field illuminated with one or more light sources, for example, Infra-Red (IR), Ultra-Violet (UV) and/or the like. The spectral response of one or more of the pests to the illumination may differ from that of the crop and/or the crop field and the spectral maps may be therefore analyzed to identify such pest(s), for example, weeds, insects, alterations and/or symptoms in the crop plants and/or the like. Optionally, at least part of the pest distribution may be derived from sensory data captured for samples (e.g. sections, portions, etc.) of the crop field which may be manipulated (e.g. extrapolated, interpolated and/or the like) to estimate the pest distribution in other sections of the crop field.

The pest distribution and/or part thereof may be further derived from one or more reports, for example, survey reports, scouting reports and/or the like generated for the crop field which may comprise information relating to one or more of the pests, in particular to the distribution of the pets(s). Moreover, at least some of the pest distribution may be derived from one or more reports generated for one or more samples of the crop field, for example, a section, a portion and/or the like which may be manipulated to estimate the pest distribution in other sections of the crop field.

Optionally, the pest distribution may be based on past sensory data captured in the crop field and/or one or more reports generated for the crop field during one or more previous growth cycles comprising pest distribution information.

Optionally, the segmentation of the crop field to the plurality of segments is further based on a zone map generated for the crop field according to one or more attributes identified, measured and/or computed for one or more zones of the crop field, for example, soil attributes, water attributes and/or topographic attributes.

A respective dosage of one or more of the selected crop protection materials may be then computed for each of the plurality of segments of the crop field based on the pest distribution identified in each segment. The respective dosage is a dosage which is estimated to effectively control the pest(s) (e.g. eradicate, repel, etc.) in the respective segment as reflected by the pest distribution identified in the respective segment. Effective control of the pest(s) may be defined according to one or more criteria. For example, the effective control may reflect that a predefined minimal estimated percentage of the pest(s) are estimated to be eradicated and/or repelled in the respective segment, for example, 70%, 80%, 90%, 95%, and/or the like. In another example, the effective control may reflect that the impact of the pest(s) to reduce the yield of the crop in the respective segment is estimated to be less than a predefined maximal percentage, for example, 30%, 20%, 10%, 5%, and/or the like.

Optionally, one or more Machine Learning (ML) models may be applied to use Artificial Intelligence (AI) for computing the effective dosage of the crop protection materials) for one or more of the segments. The ML models may be trained and learned to correlate between application parameters of the crop protection materials (e.g. type, dosage, time of application, etc.) and their impact on pests, i.e. their effectivity in controlling the pests (e.g. eradicated and/or repelled percentage, impact on yield percentage, etc.).

The variable rate application may be then computed for applying the total dosage (or part of) of the crop protection material(s) in the crop field based on the dosages computed for each of the segments. The variable rate application may therefore define a varying application of the crop protection material(s) in at least some of the segments in the crop field according to the respective dosage computed for these segments.

Optionally, the variable rate application is applied for applying the crop protection material(s) in only a subset of the segments of the crop field. This may be done, for example, in case the cumulative dosage computed for all the segments exceeds the total dosage computed for the entire crop field and the total dosage is thus insufficient for applying the crop protection material(s) in all segments. In such case the segments may be ranked based on the pest distribution identified in each of the segments, for example, a high ranking score may be computed for segments in which the identified pest distribution is high while a low ranking score may be computed for segments in which the identified pest distribution is low. The variable rate application may be computed for applying the crop protection material(s) in a subset of the segments selected according to their ranking such that a cumulative dosage of the selected segments does not exceed the total dosage. For example, a subset may be selected to include the highest ranking segments which have a cumulative dosage that does not exceed the total dosage. In another example, selection of the subset of segments may be based on the geographical location of the segments. In another example, the subset include segments selected to limit pest(s) spreading and/or expansion from one or more of the selected segments to one or more other segments.

Optionally, the variable rate application is computed such that the selected crop protection material(s) is not applied at all in one or more of the segments of the crop field. Not treating one or more of the crop field segments may be done, for example, to avoid exceeding the total dosage allowed for application in the crop field at the expense that the yield of the crop may be reduced due to the uncontrolled pest(s) in the untreated segment(s). In another example, one or more segments may not be treated in case it is estimated that the selected crop protection material(s) may be ineffective to control the pest(s) in this segment(s) and it may be more effective to apply one or more different crop protection materials in this segment(s).

Instructions may be generated for applying the crop protection material(s) in the crop field according to the computed variable rate application. The variable rate application instructions may be used by one or more ground and/or aerial, autonomous and/or manually operated applicator systems, for example, a system, a machine, a vehicle, a device, an apparatus and/or the like configured, adjusted and/or operated to apply (spray) the crop protection material(s) in the crop field. Specifically, the instructions may be used by applicator systems configured, adjusted and/or operated in real-time to control and adjust the rate (e.g. amount, volume, flow, etc.) of crop protection material(s) applied (sprayed) at any given time thus supporting the variable rate application according to the instructions.

While one or more of the crop protection material(s) may be selected for application in the crop field according to agricultural practices, conventions and/or knowledge learned and practiced in the past, optionally, one or more of the crop protection material(s) may be selected according to the type of pest(s) identified in the crop field based on analysis of crop field.

Optionally, the effective dosage may be first computed for each of the segments of the crop field after segmented based on the pest distribution. The variable rate application may be then computed for applying the crop protection material(s) in the segments according to the respective effective dosages computed for each of the segments. The generated plan comprising instructions for the variable rate application may be then approved in case the cumulative dosage of all effective dosages does not exceed the total dosage computed for the crop field and rejected in case the cumulative dosage exceeds the total dosage. Optionally, in case the cumulative dosage exceeds the total dosage, a subset of the plurality of segments may be selected to be applied with the crop protection material(s) according to the variable rate application.

The variable rate application of the crop protection material(s) may present major benefits and advantages compared to existing methods and systems for applying crop protection materials.

First, some of the existing methods may apply a constant (fixed) rate application of the total dosage of the crop protection material(s) across the entire crop field. Since the pest distribution may vary between different segments of the crop field, applying the crop protection material(s) in a constant rate may lead to applying excessive crop protection material(s) in segments with low pest distribution while applying potentially insufficient and hence ineffective dosages in high pest distribution segments. In contrast, the variable rate application(s) may ensure that each of the segments may be applied with an effective dosage specifically computed for the respective segment based on the pest distribution identified in the respective segment while complying with the restrictions on the average residue level derived from the predefined MRL. Segments with low pest distribution may be applied with reduced and optionally no crop protection material(s) while high pest distribution segments may be applied with increased dosages of the crop protection material(s) to effectively eradicate the pests in these segments.

Moreover, the total dosage of the protection material(s) allowed for the crop field is limited in order to comply with the predefined MRL, specifically for the crop(s) extracted from the crop field. Therefore, applying the limited total dosage in a constant rate over the crop field may lead to reducing the dosage applied in each segment such that the dosages of the crop protection material(s) applied in high pest distribution segments of the crop field may be insufficient and thus ineffective to eradicate the pests in these segments. The variable rate application on the other hand may significantly increase utilization of the limited total dosage since the low pest distribution segments may be applied with a significantly reduced dosage of the crop protection material(s) and optionally not applied at all thus preserving increased volumes of the crop protection material(s) for application in segments which require increased dosages.

Furthermore, since modern agriculture is constantly evolving and advancing towards precision agriculture, means, for example, systems, devices and methods are already deployed in many agriculture areas to support sensory data capturing, imaging, field survey, mapping and/or the like of the crop fields. The variable rate application may therefore take advantage of such existing means to map and segment the crop fields without further deployment of imaging and mapping equipment and/or infrastructure.

In addition, by analyzing the crop field to identify the type and distribution of the pest(s) in the crop field, most suitable crop protection material(s) may be selected to increase the effectiveness in eliminating the pest(s) with potentially reduced dosages of the crop protection material(s) applied in the entire crop field.

Also, applying the ML model(s) and using AI to compute the dosages of the crop protection material(s) applied in the segments may increase accuracy of the effective dosages applied only where needed, without under-dosing may significantly slow down pest resistance development.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The computer readable program instructions may be further executed as one or more web and/or cloud based applications either connected or disconnected to the internet in real-time. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of generating instructions for variable rate application of crop protection materials in a crop field mapped to a plurality of segments based on pest distribution, according to some embodiments of the present invention.

An exemplary process 100 may be executed to generate a plan (prescription) comprising instructions for applying one or more crop protection materials in a variable rate application manner in a crop field, i.e. an agricultural field in which one or more crops are planted, for example, a farmland, an orchard, a garden, a plantation, a vineyard and/or the like in a variable rate application manner.

The variable rate application is computed to apply effective dosages of the crop protection material(s) in different sections or segments of the crop field while a residue of the crop protection material(s) in the crop, specifically the crop product does not exceed a certain MRL threshold.

Reference is also made to FIG. 2, which is a schematic illustration of an exemplary system for generating instructions for variable rate application of crop protection materials in a crop field mapped to a plurality of segments based on pest distribution, according to some embodiments of the present invention. An exemplary crop protection materials calculation system 200, for example, a computer, a server, a computing node, a cluster of computing nodes, and/or the like may be deployed to execute a process such as the process 100 for generating instructions for applying one or more crop protection materials in a crop field in a variable rate application manner.

The crop protection materials calculation system 200 may include an Input/Output (I/O) interface 210, a processor(s) 212 and a storage 214 for program code store and/or data store.

The I/O interface 210 may comprise one or more wired and/or wireless interfaces, for example, a Universal Serial Bus (USB) interface, a serial interface, a Radio Frequency (RF) interface, a Bluetooth interface and/or the like. The I/O interface 210 may further include one or more network and/or communication interfaces for connecting to a network 206 comprising one or more wired and/or wireless networks, for example, a Local Area Network (LAN), a Wireless Local Area Network (WLAN), a Wide Area Network (WAN), a Municipal Area Network (MAN), a cellular network, the internet and/or the like.

The crop protection materials calculation system 200 may use the I/O interface 210 to output a plan and/or a prescription comprising the instructions for variable rate application of one or more of the crop protection material(s) in a crop field 204, for example, a farmland, an orchard, a garden, a plantation, a vineyard and/or the like. For example, the instructions may be computed and provided to one or more applicator systems 202 configured to apply the crop protection material(s) in the crop field 204, for example, spray, sprinkle, scatter and/or the like collectively designated spray herein after. In particular, each of the applicator systems 202 may be configured, adjusted and/or operated in real-time to control and adjust of the amount, volume and/or flow of each sprayed crop protection material in order to support the variable rate application according to the instructions.

The applicator systems 202 may include ground and/or aerial unmanned autonomous and/or manually operated systems, for example, a system, a machine, a vehicle, a device, an apparatus and/or the like. For example, the applicator systems 202 may include one or more manually operated ground vehicles, for example, a tractor 202A pulling a spraying trailer which comprises one or more tanks containing one or more of the crop protection materials and is configured to spray each crop protection material in a variable rate. In another example, the applicator systems 202 may include one or more autonomous ground vehicles and/or systems, for example, an automated spraying system which may be deployed, moved and maneuvered in the crop field 204. The automated spraying system may connect to one or more reservoirs containing one or more of the crop protection materials and may be further configured to spray each crop protection material in a variable rate. In another example, the applicator systems 202 may include one or more manually operated aerial vehicles, for example, a helicopter 202B configured to carry one or more tanks containing one or more of the crop protection materials and further configured to spray each crop protection material in a variable rate. In another example, the applicator systems 202 may include one or more autonomous aerial vehicles, for example, an Unmanned Aerial Vehicle I(UAV), a drone and/or the like configured to carry one or more tanks containing one or more of the crop protection materials and further configured to spray each crop protection material in a variable rate.

Via the I/O interface 210, specifically over the network, the crop protection materials calculation system 200 may further communicate with one or more remote networked resources 230, for example, a client terminal operated by a user for controlling the task management system 200, a computing resource, a storage resource, a database, a service, a cloud resource and/or the like.

The processor(s) 212, homogenous or heterogeneous, may include one or more processors arranged for parallel processing, as clusters and/or as one or more multi core processor(s). The storage 214 may include one or more non-transitory persistent storage devices, for example, a Read Only Memory (ROM), a Flash array, a hard drive and/or the like. The storage 214 may also include one or more volatile devices, for example, a Random Access Memory (RAM) component, a cache memory and/or the like. The storage 214 may further include one or more network storage resources, for example, a storage server, a network accessible storage (NAS), a network drive, a cloud storage and/or the like accessible via the network interface 210.

The processor(s) 212 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. The processor(s) 212 may further include, integrate and/or utilize one or more hardware modules (elements integrated and/or utilized in the task management system 200, for example, a circuit, a component, an Integrated Circuit (IC), an Application Specific Integrated Circuit (ASIC), a Field Programmable Gate Array (FPGA), a Digital Signals Processor (DSP) and/or the like.

The processor(s) 212 may therefore execute one or more functional modules, for example, a crop protection materials calculator 220 for executing the process 100 executed using one or more software modules, one or more of the hardware modules and/or a combination thereof.

Optionally, the crop protection materials calculation system 200, specifically the crop protection materials calculator

220 may be implemented as one or more cloud computing services, for example, an Infrastructure as a Service (IaaS), a Platform as a Service (PaaS), a Software as a Service (SaaS) and/or the like deployed over one or more cloud computing platforms such as, for example, Amazon Web Service (AWS), Google Cloud, Microsoft Azure and/or the like.

As shown at 102, the process 100 starts with the crop protection materials calculator 220 computing a total (overall) dosage (amount) of one or more crop protection materials, for example, herbicide, fungicide, pesticide, nematicide, insecticide, miticide, surfactant, and/or the like selected for application in the crop field 204. Such crop protection materials may include, for example, Glufosinate, Glyphosate, Mancozeb, Chlorothalonil, Propiconazole, Linuron, Iprodione and/or the like.

The crop protection material(s) may be selected to control, for example, eradicate, kill, incapacitate, repel, deter, contain, limit, and/or otherwise discourage one or more pests, for example, weed, nematode, mite, fungi, insect, a disease pathogen and/or the like from infecting the crop field 204, its soil, and/or one or more crops planted in the crop field 204, for example, a farmland, an orchard, a garden, a plantation, a vineyard and/or the like.

The total dosage is the maximal dosage of the crop protection material(s) allowed for application in the crop field 204. The allowed total dosage may be derived from an MRL predefined by one or more regulations, directives, conventions and/or guidelines defined and/or applicable for the crop field 204 such that a residue of the crop protection material(s) on product(s) of the crop(s) extracted (harvested, picked, collected, etc.) from the crop field 204 does not exceed a certain limit. The residue of the crop protection material(s) may present one or more health risks when the crop(s) product(s) is consumed and the MRL is therefore predefined in order to prevent contamination of the product(s) by the potentially hazardous residue.

Specifically, crop protection materials calculator 220 may compute the total allowed dosage based on an average residue of the crop protection material(s) in the crop's products such that the residue averaged across all products of the crop does not exceed the predefined MRL. This may apply in particular to crop products which are mixed together after extracted from the crop field, for example, wheat, rice, and/or the like.

The crop protection materials calculator 220 may compute the total dosage according to an estimated residue of the crop protection material(s) on the crop's product which may primarily depend on the amount of crop protection material(s) applied (sprayed) on the crop and the disintegration rate or decay time of the applied crop protection material(s).

As shown at 104, the crop protection materials calculator 220 may adjust the total dosage of the selected crop protection material(s) according to one or more residue affecting parameters applicable for the crop field 204 which may affect and/or impact the residue level of one or more of the crop protection material(s) in the crop(s) product(s).

The residue affecting parameters may relate to attributes of the crop field 204 itself which may affect the levels of the residual crop protection material(s) affecting the crop(s) product(s), for example, a type of the soil in the crop field 204, the OM content in the crop field 204, an absorption parameters of the soil and/or the like. For example, a soil type characterized by high absorption may reduce the residual level of the crop protection material(s) potentially contaminating the crop product while a soil type characterized by low absorption may increase the residual level of the crop protection material(s). In another example, a high OM content may reduce the residual level of the crop protection material(s) potentially contaminating the crop product while a low OM content may increase the residual level of the crop protection material(s).

The residue affecting parameters may also relate to attributes of one or more of the crop(s) planted in the crop field 204, for example, type of the crop(s), a growth stage of the crop, an estimated biomass of the crop(s) (specifically the crop(s) product(s)) and/or the like. Each of these crop attributes may naturally affect the amount and/or level of residual crop protection material(s) associated with the crop product which may be expressed in terms of the overall crop product, in units of the crop product (e.g. per kilogram, per pound, etc.) in items of the crop product (e.g. per fruit, etc.). For example, high estimated biomass may reduce the residual level of the crop protection material(s) per unit and/or per item of the crop product while a low estimated biomass may increase the residual level of the crop protection material(s) per unit and/or per item of the crop product. In another example, a short time remaining until extraction (e.g. harvest, pick, etc.) of the crop product from the crop field 204 may reduce the time for the crop protection material(s) to leave the crop product(s) (e.g. disintegrate, vaporize, wash away. Etc.) which may increase the residual level contaminating the crop product. In contrast, a long time remaining until extraction of the crop product from the crop field 204 may increase the time for the crop protection material(s) to leave the crop product(s) which may reduce the residual level in the crop product. Moreover, in case the crop protection material(s) is applied in a pre-emergent phase of the final crop product (e.g. fruit, flower, etc.) may further reduce the residual level contaminating the crop product.

The residue affecting parameters may also relate to attributes of one or more of the crop protection material(s) selected to be applied in the crop field 204, for example, a type of the pest(s) identified in the crop field 204, a type of the crop protection material, a disintegration parameter of the crop protection material, a vaporization parameter of the crop protection material and/or the like. For example, a fast disintegrating and/or vaporizing crop protection material may reduce the residual level of the crop protection material(s) potentially contaminating the crop product while a slowly disintegrating and/or vaporizing crop protection material may increase the residual level of the crop protection material(s) potentially contaminating the crop product. Since the type of the pest(s) may at least partially dictate the selection of the type and/or dosage of the crop protection material(s) applied in the crop field 204, the pest type may also indirectly affect the level of crop protection material(s) residue contaminating the crop product.

The residue affecting parameters relating to the crop protection materials attributes may further relate to attributes of one or more of the crop protection material(s) which were applied in the crop field 204 in the past during the current growth cycle and/or are planned to be applied in the crop field 204 in the future during the current growth cycle. The residue of the crop protection material(s) which may contaminate the final crop product may be accumulated over a plurality of applications of one or more of the crop protection materials on the crop(s) in the crop field 204 during the same growth cycle. Therefore, the total dosage computed for application in the crop field 204 must take into consideration the residue from previous application(s) and/or future application(s) of one or more of the crop protection materials which summed together should not exceed the MRL defined for the crop(s) in the crop field 204.

The residue affecting parameters may further relate to one or more environment conditions relating to the crop field 204, i.e. environment conditions which are applicable for a geographical region of the crop field 204, for example, time of year, typical temperature, typical humidity, predicted precipitation and/or the like. For example, frequent rain in the crop field 204 wash away more residue of the crop protection material(s) thus reducing the residual level of the crop protection material(s) which may contaminate the crop(s) product(s) while a rare and limited rain may increase the residual level of the crop protection material(s) on the crop(s) product(s). In another example, many sunny days in the geographical area of the crop field 204 may contribute to increased disintegration and/or vaporization of the residue of the crop protection material(s) which may contaminate the crop(s) product(s) while a few and more so no sunny days in the geographical area of the crop field 204 may reduce disintegration and/or vaporization of the residue of the crop protection material(s).

As shown at 106, the crop protection materials calculator 220 may map the crop field 204 to a plurality of segments according to a distribution of one or more pests identified in each of the segments of the crop field 204. The pest distribution may be expressed by, for example, volume, density, concentration and/or the like. The pest distribution may be mapped and identified using one or more methods, techniques and/or algorithms.

According to some embodiments, the pest distribution may be mapped and identified by analyzing sensory data depicting the crop field 204 which is captured by one or more sensors deployed to monitor the crop field 204. Optionally, at least part of the pest distribution may be derived from sensory data captured for samples (e.g. sections, portions, etc.) of the crop field 204 which may be manipulated, for example, extrapolated, interpolated and/or the like to estimate the pest distribution in other sections of the crop field 204. For example, the sensory data may include one or more images of the crop field 204 captured by one or more imaging sensors, for example, a camera, a video camera, an Infra-Red sensor, a thermal imaging sensor and/or the like deployed and configured to monitor the crop field 204. The pest distribution may be thus identified by analyzing the image(s) of the crop field 204 using one or more image processing and computer vision methods, techniques and/or algorithm to identify one or more of the pests which may potentially damage and/or inhibit growth of one or more crops planted in the crop field 204. In particular, the image(s) may be analyzed to identify visual evidence and/or signs indicative of possible presence of one or more of the pests in the crop field 204. For example, the image(s) may be analyzed to identify weeds which are visually detectable growing among the crop plants in the one or more sections of the crop field 204. Moreover, based on the analysis the type or species of the one or more of the detected weeds may be identified. In another example, the image(s) may be analyzed to identify one or more visual alterations and/or symptoms in the crop plants planted in the crop field 204 which may indicate infection and/or injury by one or more of the pests, for example, nematode, mite, fungi, insect, the disease pathogen and/or the like infecting the crop plants. The image(s) may be further analyzed to identify an estimated type or species of the pest(s) present in the crop field based on the visual alterations and/or symptoms typical to the pest(s).

In another example, the sensory data may include one or more spectral maps of the crop field 204 illuminated with one or more light sources, for example, Infra-Red (IR), Ultra-Violet (UV) and/or the like. The spectral response of one or more of the pests to the illumination may differ from that of the spectral response of the crop plants and/or the crop field 204 and the spectral map(s) may be therefore analyzed to identify such pest(s), for example, weeds, insects, alterations and/or symptoms in the crop plants and/or the like. Moreover, based on the analysis of the spectral map(s), the type or species of the one or more of the detected weeds may be identified.

The sensory data depicting the crop field 204 may be captured by one or more ground, aerial and/or space systems, vehicles and/or devices operated to traverse the crop field 204 and capture data, for example, images, spectral data and/or the like of the crop field 204. For example, one or more images of the crop field 204 may be captured by one or more imaging sensors mounted on one or more satellites passing above the crop field 204. In another example, one or more images and/or spectral maps of the crop field 204 may be captured by one or more imaging sensors mounted on one or more autonomous and/or manually operated aerial vehicles, for example, a UAV, a drone, an aircraft and/or the like operated to fly over the crop field 204. In another example, one or more one or more images and/or spectral maps of the crop field 204 may be captured by one or more imaging sensors mounted on one or more autonomous and/or manually operated ground vehicles operated to drive in, around and/or in proximity to the crop field 204.

Optionally, one or more trained Machine Learning (ML) models may be applied to the sensory data to identify one or more of the pests in the crop field 204. The ML model(s), for example, a neural network, a Support Vector Machine (SVM) and/or the like may be trained in one or more supervised and/or unsupervised training sessions with one or more training datasets comprising sensory data, for example images, spectral maps and/or the like of crop fields infected with one or more of the pests. The ML model(s) may thus learn, adjust and evolve to correlate between the visual features associated with one or more of the pests, for example, the weed appearance, the plant's infection symptoms and/or the like and the respective pest(s). In another example, the ML model(s) may learn, adjust and evolve to correlate between the spectral response associated with one or more of the pests and the respective pest(s).

According to some embodiments, the crop field 204 may be mapped to the plurality of segments based on analysis of one or more crop growth reports, scouting reports and/or surveys generated for the crop field 204 for the current growth cycle and/or one or more previous growth cycles in the crop field 204. One or more of the report(s) may include pest distribution information which may be analyzed to map the crop field 204 to a plurality of segments according to the pest distribution documented in the report(s). The report(s) may be stored in one or more of the remote networked resource 208 which may be accessed and retrieved by the crop protection materials calculator 220 via the network 206. Moreover, at least some of the pest distribution may be derived from one or more reports generated for one or more samples of the crop field 204, for example, a section, a portion and/or the like which may be manipulated to estimate the pest distribution in other sections of the crop field 204.

The crop protection materials calculator 220 may segment the crop field 204 to the plurality of segments such that the pest distribution is substantially uniform in each of the segments. As such, high pest distribution in a certain segment may indicate large volume, density, and/or concentration of the respective pest in the respective segment while low pest distribution in a certain segment may indicate low (small) volume, density, and/or concentration of the respective pest in the respective segment. Optionally, the crop protection materials calculator 220 may segment the crop field 204 to the plurality of segments according to one or more pest distribution scales, for example, a percentage of infected crop plants and/or the like. In such embodiments the crop protection materials calculator 220 may generated segment in which the pest distribution is within a predefined range of pest distribution, for example, 0%-10%, 11%-20%, 21%-30%, 31%-40% and so on.

This means that the crop protection materials calculator 220 may identify the distribution of the pest(s) in the crop field 204 and may segment the crop field 204 to the segments according to the pest distribution identified in each of the segments. For example, adjacent sections of the crop field 204 which are identified to have substantially similar pest distribution may be segmented together. In another example, the crop field 204 may be segmented to a plurality of segments either arbitrarily and/or based on one or more attributes of the segments and each segment may be associated with a respective pest distribution.

Optionally, the crop protection materials calculator 220 may segment the crop field 204 to the plurality of segments based on one or more zone maps of the crop field 204 mapping the crop field 204 to a plurality of zones. The zone map(s) of the crop field 204 may be based on one or more soil attributes of each of the zones, for example, soil attributes, water attributes, topographic attributes and/or the like. The soil attributes which may be measured in the zones in the crop field 204 using one or more sensors, may include, for example, pH, Electrical Conductivity (EC), Cation Exchange Capacity (CEC), Organic Matter (OM) content and/or the like. The water attributes which may be measured in the zones using one or more sensors and/or extracted for the zones from imagery data of the crop field 204, may include, for example, water flow patterns and/or the like. The topographic attributes which may be extracted for the zones based on topographic map(s) and/or field survey(s) of the crop field 204, imagery data of the crop field 204 and/or the like may include, for example, elevation, slope, inclination, surface facing direction and/or the like. The zone map(s) may be stored in one or more of the remote networked resource 208 which may be accessed and retrieved by the crop protection materials calculator 220 via the network 206.

The crop protection materials calculator 220 may further compute a ranking score for each of the plurality of segments of the crop field 204 based on the pest distribution identified in the respective segment. For example, the crop protection materials calculator 220 may compute the ranking score proportionally to the pest distribution such that high pest distribution may translate to a high ranking score while low pest distribution may translate to a low ranking score. Segments identified with high pest distribution may be therefore assigned high ranking scores while segments identified with low pest distribution may be assigned low ranking scores.

According to some embodiments, the crop field 204 may be mapped to the plurality of segments according to pest distribution identified based on analysis of past sensory data, for example, one or more images of the crop field 204, one or more spectral maps of the crop field 204 and/or the like. The past sensory data, specifically past sensory data captured during one or more previous growth cycles in the crop field 204 may be analyzed to identify pest destitution of one or more of the pests in the crop field 204.

Figure 3A:
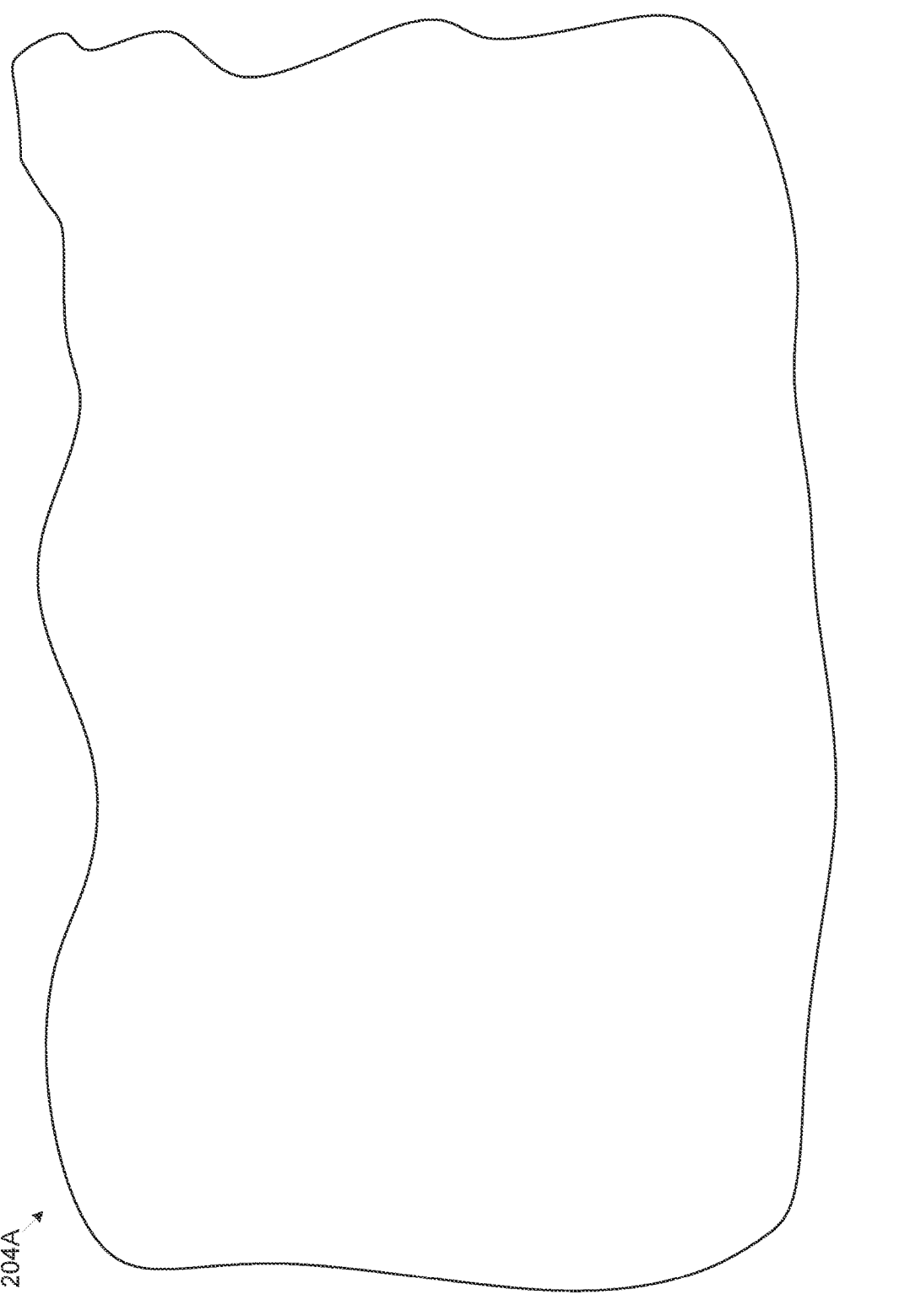
FIG. 3A and FIG. 3B are schematic illustrations of an exemplary crop field mapped to a plurality of segments for variable rate application of crop protection materials based on pest distribution identified in each segment, according to some embodiments of the present invention.
Figure 3B:

Reference is now made to FIG. 3A and FIG. 3B, which are schematic illustrations of an exemplary crop field mapped to a plurality of segments for variable rate application of crop protection materials based on pest distribution identified in each segment, according to some embodiments of the present invention. An exemplary crop field 204A such as the crop field 204 shown in FIG. 3A may be planted with one or more crops.

A crop protection materials calculator such as the crop protection materials calculator 220 may analyze one or more images of the crop field 204A to identify visually evidence and/or signs indicative of a presence of one or more pests (e.g. weed, nematode, mite, fungi, insect, pathogen, etc.) infecting, injuring and/or damaging one or more of the crop(s) planted in the crop field 204 and/or pests inhibiting and/or degrading growth of the plants (e.g. weeds).

Based on the analysis, the crop protection materials calculator 220 may map the crop field 204A to a plurality of segments 302 as shown in FIG. 3B. In particular, the crop protection materials calculator 220 may segment the crop field 204A to the segments 302 based on the pest distribution identified in each of the segments 302.

Moreover, the crop protection materials calculator 220 may compute the ranking score for each of the plurality of segments 302 which may be directly proportional to the pest distribution identified in the respective segment. For example, the crop protection materials calculator 220 may set a pest distribution scale having multiple gradual values, for example, 1-5 where the value 5 indicates very high pest distribution (presence, volume, density, concentration, etc.) while the value 1 may indicate very low pest density and possibly no pest presence.

Reference is made once again to FIG. 1.

As shown at 108, the crop protection materials calculator 220 may compute a respective dosage of one or more of the selected crop protection materials for each of the plurality of segments of the crop field 204 based on the pest distribution of one or more of the pest(s) identified in the respective segment. Specifically, the crop protection materials calculator 220 may compute the respective dosage which is estimated to effectively control, for example, eradicate, kill, incapacitate, repel, deter, contain, limit, and/or otherwise discourage the pest(s) in the respective segment as reflected by the pest distribution identified in the respective segment.

The crop protection materials calculator 220 may apply one or more criteria for estimating the effective control of the pest(s) in each of the segments of the crop field 204. For example, the effective control may reflect that a predefined minimal estimated percentage of the pest(s) are estimated to be eradicated and/or repelled in the respective segment, for example, 70%, 80%, 90%, 95%, and/or the like. In another example, the effective control may reflect that the impact of the pest(s) to reduce the yield of the crop in the respective segment is estimated to be less than a predefined maximal percentage, for example, 30%, 20%, 10%, 5%, and/or the like. However, the crop protection materials calculator 220 may apply additional considerations to compute the respective dosage for one or more of the segments which is estimated to the desired effectivity. For example, in some cases it may be impossible to achieve high control, for example, pest eradication beyond a certain percentage, for example, 50% in one or more of the segments even with significantly high dosages of the crop protection material(s). However, it may be still desirable to apply the crop protection material(s) in these segments, possibly in high dosage in order to limit and desirably prevent the pest(s) from further expanding in the segment(s) and/or from spreading to other segment(s) of the crop field 204.

As such, the crop protection materials calculator 220 may compute increased dosages for segments in which higher pest distribution is identified while reduced dosages may be computed for segments in which lower pest distribution is identified. For example, some of the segments 302 in FIG. 3B are identified to have high pest distribution reflected FIG. 3B by high values, for example, 4-5, other segments 302 are identified to have moderate pest distribution reflected FIG. 3B by medium values, for example, 2-3 and some other segments 302 are identified to have little and possibly no pest distribution reflected in FIG. 3B by low values, for example, 1. In such case the crop protection materials calculator 220 may compute increased dosages for the segments marked with values 4-5, reduced dosages for the segments marked with values 2-3 and small dosages for the segments marked with value 1.

Optionally, the crop protection materials calculator 220 may employ one or snore ML models, for example, a neural network, an SVM and/or the like to use AI for computing the effective dosage of the crop protection material(s) for one or more of the segments. The ML models may be trained and learned to correlate between application parameters of the crop protection materials (e.g. type, dosage, time of application, etc.) and their impact on pests, i.e. their effectivity in controlling the pests (e.g. eradicated and/or repelled percentage, impact on yield percentage, etc.). The ML models may be trained and learned to correlate between application parameters of the crop protection materials (e.g. type, dosage, time of application, etc.) and their impact on pests, i.e. their effectivity in controlling the pests (e.g. eradicated and/or repelled percentage, impact on yield percentage, etc.) optionally for various crop field topologies and/or different residue affecting parameters and/or a combination thereof. The ML model(s) may be therefore trained in one or more supervised and/or unsupervised training sessions with one or more training datasets comprising information relating to the impact on pests and/or on crop yields of varying dosages of different crop protection materials applied to varies crop fields infected with one or more of the pests. The ML model(s) may thus learn, adjust and evolve to correlate between selected crop protection materials and/or dosages and effective control of the pests. The crop protection materials calculator 220 may therefore apply the trained ML model(s) to the pest distribution levels identified in one or more of the segments, for example, to the image(s) depicting the segment(s) to compute a respective dosage estimated to effectively eradicate the pest(s) identified in the respective segment(s).

According to some embodiments, the crop protection materials calculator 220 may compute a respective dosages of multiple crop protection materials for one or more of the segments in the crop field 204. For example, in case the crop protection materials calculator 220 identifies that the crop in one or more of the segments is infected with multiple different pests, for example, weeds of a certain type and an insect. In such case the crop protection materials calculator 220 may compute a respective dosage for multiple crop protection materials, for example, an herbicide and a pesticide estimate to effectively eradicate the weeds and the certain insets. In another example, the crop protection materials calculator 220 may estimate that a combination of multiple crop protection materials which would be applied in one or more of the segments may effectively eradicate a certain pest identified in the respective segment(s). In particular, the crop protection materials calculator 220 may estimate that the combined application of the multiple crop protection materials may be more efficient in eradicating the certain pest and/or result in reduced residue infecting the crop(s) product(s) compared to a single crop protection material. For example, assuming a certain type of weed is identified in one or more of the segments of the crop field 204. The crop protection materials calculator 220 may estimate that a combination of tow herbicides may more efficient to effectively eradicate the certain weed compared to any single herbicide.

Optionally, one or more of the crop protection material(s) selected for application in the crop field 204 are selected according to the type of pest(s) identified in the crop field based on the analysis of the sensory data (e.g. images, spectral maps, etc.) of the crop field 204, the reports generated for the crop field 204 and/or a combination thereof.

As shown at 110, the crop protection materials calculator 220 may compute a variable rate application of at least part of the total dosage of the crop protection material(s) in the crop field 204. The crop protection materials calculator 220 may compute the variable rate application to apply in at least some of the segments in the crop field 204 the respective dosage computed for these segments.

In case a cumulative dosage of the dosages of all segments of the crop field 204, i.e. a sum of all the dosages of all the segments is less or equal the total dosage allowed for the entire crop field 204 then the crop protection materials calculator 220 may compute the variable rate application to apply to all the segments.

However, in case the cumulative dosage exceeds the total dosage, the crop protection materials calculator 220 may compute the variable rate application to apply the crop protection material(s) in only a subset of the segments of the crop field 204. In particular, the crop protection materials calculator 220 may select to the subset one or more segments which together require a cumulative dosage that does not exceed the total dosage.

The crop protection materials calculator 220 may apply one or more selection schemes and/or criteria in order to select the segments of the subset in which the crop protection material will be applied according to the variable rate application. For example, the crop protection materials calculator 220 may select the subset to include one or more highest ranking segments which have the highest ranking score among the plurality of segments. specifically, the crop protection materials calculator 220 may select a subset of the highest ranking segments having a cumulative dosage which does not exceed the total dosage. This may serve to eradicate the pest(s) in the segments which are most infected by the pest(s) while other segments which are infected to a lesser degree and hence expected to survive the pest injury may be left unattended. In another example, the crop protection materials calculator 220 may select the subset to include a plurality of segments according to their geographical location in the crop field 204. For example, the crop protection materials calculator 220 may select the subset to include the most western segments of the crop field 204 while excluding from the subset at least some segments in the eastern parts of the crop field 204. This may be effective in case there are limited applicator system(s) 202 which may have limited travel and/or coverage range and may be thus unable to cover the entire crop field in order to apply the crop protection material(s). In another example, the crop protection materials calculator 220 may select the subset to include a plurality of segments to limit spreading and/or expansion of the pest(s) from one or more of the selected segments to one or more other segments.

Optionally, the crop protection materials calculator 220 computes the variable rate application to avoid applying the selected crop protection material(s) in one or more of the segments of the crop field 204 such that this segment(s) is untreated. The crop protection materials calculator 220 may compute the variable rate application to not treat such segment(s), for example, to avoid exceeding the total dosage allowed for application in the crop field 204 at the expense that the yield of the crop may be reduced due to the uncontrolled pest(s) in the untreated segment(s). In another example, the crop protection materials calculator 220 may compute the variable rate application to avoid treating one or more segments in case the crop protection materials calculator 220 estimates that the selected crop protection material(s) may be ineffective to control the pest(s) identified in this segment(s) and it may be more effective to apply one or more different crop protection materials in this segment(s).

Furthermore, in case the crop protection materials calculator 220 computed a respective dosage of each of multiple different crop protection materials for one or more of the segments of the crop field 204, the crop protection materials calculator 220 may further compute a respective variable rate application for each of the multiple crop protection materials.

As shown at 112, the crop protection materials calculator 220 may output, via the I/O interface 210, one or more plans and/or prescriptions comprising instructions for application of the crop protection material(s) in the crop field 204 according to the computed variable rate application.

The application instructions may be used by one or more of the applicator systems 202 configured to apply the crop protection material(s) in the crop field 204 such that the rate of the sprayed crop protection material(s) is adjusted in real time real-time according to the variable rate application as defined by the instructions.

In case multiple crop protection materials are applied in at least some of the segments of the crop field 204 each according to respective multiple variable rate applications, multiple applicator systems 202 which may be each configured to apply a certain one of the crop protection materials may be operated to apply the certain crop protection material in one or more of the segments. For example, one or more first applicator systems 202 may be used to apply a first crop protection material according to a first variable rate application and one or more second applicator systems 202 may be used to apply a second crop protection material according to a second variable rate application.

According to some embodiments, the crop protection materials calculator 220 may apply an alternative sequence to compute the variable rate application. In such an alternative workflow, the crop protection materials calculator 220 may first compute the effective dosage for each of the segments of the crop field 204 according to the pest distribution identified in the respective segment as described in step 108. The crop protection materials calculator 220 may then compute the variable rate application for applying the crop protection material(s) in the segments of the crop field 204 according to the respective effective dosages computed for each of the segments as described in step 110. The plan generated by the crop protection materials calculator 220 which comprises the instructions for the variable rate application as described in step 112 may be then approved in case the cumulative dosage of all effective dosages does not exceed the total dosage computed for the crop field 204 and optionally rejected in case the cumulative dosage does exceed the total dosage. Optionally, in case the cumulative dosage exceeds the total dosage, the crop protection materials calculator 220 may adjust the instructions to instruct applying the crop protection material(s) in only a subset of the plurality of segments according to the variable rate application. The crop protection materials calculator 220 may select the subset according to one or more selection schemes and/or criteria as described herein before, for example, according to the ranking score computed for the segments, according to the geographical location of the segments, according to the ability to limit the spreading and/or expansion of the pest(s) from the selected segments to other segments and/or the like.

Additionally and/or alternatively, one or more multi-application applicator systems 202 may be used to apply multiple crop protection materials in parallel and/or serially according to respective variable rate applications. For example, a helicopter such as the helicopter 202B may be configured to carry two separate containers each containing a different crop protection material. The helicopter 202B may be operated to apply the two different crop protection materials in one or more segments of the crop field 204 according to two respective variable rate applications. To this end the helicopter 202B may fly twice over the respective segments such that in a first trip the helicopter 202B may be operated to apply a first crop protection material according to a first variable rate application instructions and in a second trip the helicopter 202B may be operated to apply a second crop protection material according to a second variable rate application instructions. In case the helicopter 202B is configurable and capable of simultaneously applying the two crop protection material, the helicopter 202B may be operated to simultaneously apply the two crop protection materials each according to its respective variable rate application instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms sensors and crop protection materials are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention.

Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of a variable rate application of crop protection materials, comprising:

computing a total dosage of at least one crop protection material allowed for application in a crop field such that residue of the at least one crop protection material in a product of a crop planted in the crop field does not exceed a predefined Maximum Residue Limit (MRL);

adjusting the total dosage according to at least some of a plurality of residue affecting parameters of the crop field;

mapping the crop field to a plurality of segments according to a pest distribution of at least one pest in each of the plurality of segments;

computing a dosage of the at least one crop protection material estimated to effectively control the at least one pest in each of the plurality of segments based on the pest distribution in the respective segment;

computing the variable rate application of the crop protection material total dosage in the crop field based on the dosage estimated for each of the plurality of segments; and outputting machine-readable instructions to one or more electronically controlled applicator systems to apply the at least one crop protection material in the crop field according to the variable rate application; wherein the one or more applicator systems comprise one or more tanks containing the crop protection material and are configured to apply the variable rate application of the at least one crop protection material in the crop field based on the machine-readable instructions;

wherein the machine-readable instructions further define applying the at least one crop protection material to at least a subset of the plurality of segments according to the variable rate application, the subset comprises segments selected from the plurality of segments such that a cumulative dosage does not exceed the total dosage;

wherein the subset comprises segments selected from the plurality of segments based on a ranking score computed for each of the plurality of segments based on a respective pest distribution in the respective segment such that the subset includes a plurality of highest ranking segments of the plurality of segments having a cumulative dosage which does not exceed the total dosage; and wherein the plurality of residue affecting parameters comprise: a type of the at least one crop protection material, a growth stage of the crop, an estimated biomass of the crop, an estimated residue from at least one previous crop protection material application in the crop field, an estimated residual crop protection material estimated for at least one future crop protection material application planned for the crop field, an Organic Matter (OM) content in the crop field, a type of the at least one pest, a type of at least one crop protection material previously applied in the crop field, and an environmental condition in a geographical region of the crop field.

2. The method of claim 1, wherein the instructions further define applying a plurality of crop protection materials each according to a respective variable rate application in case multiple crop protection materials are selected for application in at least one of the segments.

3. The method of claim 1, further comprising selecting the at least one crop protection material according to the at least one pest identified based on the pest distribution.

4. The method of claim 1, wherein the at least one pest is a member of a group consisting of: weed, nematode, mite, fungi, insect and disease pathogen.

5. The method of claim 1, wherein the at least one crop protection material is a member of a group consisting of: herbicide, fungicide, pesticide, nematicide, insecticide, miticide, surfactant and adjuvant.

6. The method of claim 1, wherein the pest distribution is identified based on analysis of at least one image of the crop field.

7. The method of claim 1, wherein the pest distribution is identified based on analysis of at least one past image of the crop field captured in at least one previous growth cycle.

8. The method of claim 1, wherein the pest distribution is identified based on analysis of at least one crop growth report generated for the crop field.

9. The method of claim 1, wherein the pest distribution is identified based on analysis of sensory data captured in the crop field by at least one sensor.

10. The method of claim 1, wherein the mapping the plurality of segments is further based on a zone map of the crop field mapping the crop field to a plurality of zones based on at least one of a plurality of soil attribute of each of the zones, the plurality of zone attributes comprising soil attributes, water attributes and topographic attributes.

11. The method of claim 1, wherein the effective control reflects eradicating and/or repelling at least a predefined minimal percentage of the at least one pest in the respective segment.

12. The method of claim 1, wherein the effective control reflects limiting an impact of the at least one pest to less than a predefined maximal percentage of a yield of the crop in the respective segment.

13. The method of claim 1, further comprising applying at least one machine learning model to compute the respective dosage for at least one of the plurality of segments, the at least one machine learning model is trained to correlate between a plurality of dosages of the at least one crop protection material and effective control of a plurality of pest distributions of the at least one pest.

14. The method of claim 1, further comprising first computing the variable rate application followed by computing the total dosage by:

mapping the crop field to the plurality of segments based on the pest distribution, computing a respective dosage of the at least one crop protection material for each of the plurality of segments based on the pest distribution in the respective segment, computing the variable rate application based on the dosage estimated for each of the plurality of segments, and computing the total dosage such that residue of the at least one crop protection material in a product of a crop planted in the crop field does not exceed the predefined MRL.

15. The method of claim 14, further comprising rejecting the variable rate application and/or part thereof in case a cumulative dosage of the respective dosages of the plurality of segments exceeds the total dosage.

16. A system for a variable rate application of crop protection materials, comprising:

one or more applicator systems; and at least one processor executing a code, the code comprising:

code instructions to compute a total dosage of at least one crop protection material allowed for application in the crop field such that residue of the at least one crop protection material in a product of a crop planted in the crop field does not exceed a predefined Maximum Residue Limit (MRL);

code instructions to adjust the total dosage according to at least some of a plurality of residue affecting parameters of the crop field;

code instructions to map the crop field to a plurality of segments according to a pest distribution of at least one pest in each of the plurality of segments;

code instructions to compute a dosage of the at least one crop protection material estimated to effectively control the at least one pest in each of the plurality of segments based on the emergent weed pest distribution in the respective segment;

code instructions to compute the variable rate application of the crop protection material total dosage in the crop field based on the dosage estimated for each of the plurality of segments; and code instructions to output machine-readable instructions to one or more electronically controlled applicator systems to apply the at least one crop protection material in the crop field according to the variable rate application;

wherein the one or more applicator systems comprise one or more tanks containing the crop protection material and are configured to apply the variable rate application of the at least one crop protection material in the crop field based on the machine-readable instructions;

wherein the machine-readable code instructions further define applying the at least one crop protection material to at least a subset of the plurality of segments according to the variable rate application, the subset comprises segments selected from the plurality of segments such that a cumulative dosage does not exceed the total dosage;

wherein the subset comprises segments selected from the plurality of segments based on a ranking score computed for each of the plurality of segments based on a respective pest distribution in the respective segment such that the subset includes a plurality of highest ranking segments of the plurality of segments having a cumulative dosage which does not exceed the total dosage; and wherein the plurality of residue affecting parameters comprise: a type of the at least one crop protection material, a growth stage of the crop, an estimated biomass of the crop, an estimated residue from at least one previous crop protection material application in the crop field, an estimated residual crop protection material estimated for at least one future crop protection material application planned for the crop field, an Organic Matter (OM) content in the crop field, a type of the at least one pest, a type of at least one crop protection material previously applied in the crop field, and an environmental condition in a geographical region of the crop field.

17. A computer program product comprising computer readable program code stored on a non-transitory computer readable medium, the computer readable program code is configured to be executed by at least one processor, wherein the computer readable program code comprises code instructions for a variable rate application of crop protection materials by:

computing a total dosage of at least one crop protection material allowed for application in the crop field such that residue of the at least one crop protection material in a product of a crop planted in the crop field does not exceed a predefined Maximum Residue Limit (MRL);

adjusting the total dosage according to at least some of a plurality of residue affecting parameters of the crop field;

mapping the crop field to a plurality of segments according to a pest distribution of at least one pest in each of the plurality of segments;

computing a dosage of the at least one crop protection material estimated to effectively control the at least one pest in each of the plurality of segments based on the pest distribution in the respective segment;

computing the variable rate application of the crop protection material total dosage in the crop field based on the dosage estimated for each of the plurality of segments; and outputting machine-readable instructions to one or more electronically controlled applicator systems to apply the at least one crop protection material in the crop field according to the variable rate application;

wherein the one or more applicator systems comprise one or more tanks containing the crop protection material and are configured to apply the variable rate application of the at feast one crop protection material in the crop field based on the machine-readable instructions;

wherein the machine-readable instructions further define applying the at least one crop protection material to at least a subset of the plurality of segments according to the variable rate application, the subset comprises segments selected from the plurality of segments such that a cumulative dosage does not exceed the total dosage;

wherein the subset comprises segments selected from the plurality of segments based on a ranking score computed for each of the plurality of segments based on a respective pest distribution in the respective segment such that the subset includes a plurality of highest ranking segments of the plurality of segments having a cumulative dosage which does not exceed the total dosage; and wherein the plurality of residue affecting parameters comprise: a type of the at least one crop protection material, a growth stage of the crop, an estimated biomass of the crop, an estimated residue from at least one previous crop protection material application in the crop field, an estimated residual crop protection material estimated for at least one future crop protection material application planned for the crop field, an Organic Matter (OM) content in the crop field, a type of the at least one pest, a type of at least one crop protection material previously applied in the crop field, and an environmental condition in a geographical region of the crop field.

* * * * *